(12) United States Patent
Baumann

(10) Patent No.: US 8,016,242 B2
(45) Date of Patent: Sep. 13, 2011

(54) SPACE SHUTTLE WITH A DEVICE FOR DOCKING TO A SATELLITE

(75) Inventor: Andreas Baumann, Schwarzenfeld (DE)

(73) Assignee: Deutsches Zentrum für Luft- und Raumfahrt e.V., Cologne (DE)

( * ) Notice: Subject to any disclaimer, the term of this patent is extended or adjusted under 35 U.S.C. 154(b) by 426 days.

(21) Appl. No.: 12/290,956

(22) Filed: Nov. 5, 2008

(65) Prior Publication Data

US 2009/0146012 A1 Jun. 11, 2009

(30) Foreign Application Priority Data

Dec. 6, 2007 (DE) .......................... 10 2007 059 033

(51) Int. Cl.
*B64G 1/64* (2006.01)
(52) U.S. Cl. ..................................... 244/172.5
(58) Field of Classification Search ............... 244/172.4, 244/172.5, 173.3
See application file for complete search history.

(56) References Cited

U.S. PATENT DOCUMENTS

| | | | |
|---|---|---|---|
| 3,408,101 A * | 10/1968 | Savary | 376/233 |
| 3,508,273 A * | 4/1970 | Schell | 343/754 |
| 4,177,964 A | 12/1979 | Hujsak et al. | |
| 4,291,910 A * | 9/1981 | Maupate | 294/95 |
| 5,005,786 A | 4/1991 | Okamoto et al. | |
| 5,735,488 A * | 4/1998 | Schneider | 244/172.4 |
| 6,299,107 B1 | 10/2001 | Kong et al. | |
| 6,523,784 B2 | 2/2003 | Steinsiek et al. | |

FOREIGN PATENT DOCUMENTS

| | | |
|---|---|---|
| DE | 198 48 427 | 4/2000 |
| DE | 10 2006 009 001 | 7/2007 |
| EP | 1 190 948 | 3/2002 |

OTHER PUBLICATIONS

International Search Report of PCT/EP2007/002910 in English.
Written Opinion of the International Searching Authority with English translation.
E. Settelmeyer et al., Dornier Satellitensysteme GmbH and K. Landzettel, DLR, 'The Experimental Servicing Satellite—ESS' (especially FIG. 7), ISTS-Conference 1998, Omiya, Japan, pp. 1-5.

* cited by examiner

*Primary Examiner* — Timothy D Collins
*Assistant Examiner* — Jamie Stehle
(74) *Attorney, Agent, or Firm* — Collard & Roe, P.C.

(57) ABSTRACT

A device provided on a space shuttle for docking to satellites, has a linkage with a cone at its distal end and a spreader mechanism, actuatable from the shuttle, with lever spreaders having their proximal ends provided with inward projections towards the linkage. At least two lever spreaders are pivotally arranged at a retaining part concentric to the linkage; the curvature at the distal end of each lever spreader is adapted to the curvature of the nozzle neck of the jet nozzle of a satellite engine. A rotatable sleeve concentric to the linkage is provided below the retaining part. A distal annular portion of the sleeve is formed with respective alternating engaging positions of different heights, and wherein, from the proximal end portion of the sleeve, two pins project that are guided by associated obliquely oriented slide faces in a stationary housing, the pins being provided for setting the adjustment travel of the linkage.

4 Claims, 5 Drawing Sheets

SPACE SHUTTLE WITH A DEVICE FOR DOCKING TO A SATELLITE

CROSS REFERENCE TO RELATED APPLICATIONS

Applicant claims priority under 35 U.S.C. §119 of German Application No. 10 2007 059 033.6 filed on Dec. 6, 2007.

BACKGROUND OF THE INVENTION

1. Field of the Invention

The invention is directed to a device provided on a space shuttle for docking to satellites, in particular communication or navigation satellites, which device comprises a linkage with a cone at its distal end—relative to the space shuttle—and a spreader mechanism, actuatable from the space shuttle, with spreader elements in the form of lever spreaders having their proximal ends—relative to the space shuttle—provided with inward projections protruding inward towards the linkage, wherein at least two lever spreaders of the device are pivotally arranged at a retaining part concentric to the linkage and the curvature at the distal end of each lever spreader is adapted to the curvature of the nozzle neck of the jet nozzle of a satellite engine.

2. Description of Related Art

Such a device for docking to satellites is known from DE 10 2006 009 001. In the known docking device, a recess is provided in the central lower part of the elongate linkage.

The docking device is inserted into a jet nozzle of an apogee engine so far that the cone at the distal end of the linkage is situated above the nozzle neck forming the narrowest part of the jet nozzle. Thereafter, the linkage is withdrawn far enough towards the space shuttle for the inward projections formed on the lever spreaders to engage the recess in the linkage. Thereby, the lever spreaders are spread so far that a predetermined defined opening angle between them is reached. Further withdrawal of the linkage will compress a helical spring; at the same time, the lever spreaders caught in the recess of the linkage are retracted so far that the ends of the lever spreaders, spread in a defined manner, to positively abut on the inner wall of the nozzle neck.

Since the lever spreaders have a curvature adapted to the curvature of the nozzle neck, the contact pressure between the ends of the lever spreaders and the nozzle neck is much lower than in previously used docking devices. Due to the substantially lower contact pressure between the spreader levers and the nozzle neck, cold welding between the top ends of the spreader levers and the inner wall in the area of the nozzle neck is practically excluded.

From DE 198 48 427 A1, a device for docking, e.g. to a satellite, is known, wherein a feather mandrel coupling mechanism is provided which substantially consists of a structural unit formed by a feather mandrel and a contact head. In this coupling mechanism, however, the lever spreaders are not pivotally supported and have no projecting inward projections, either.

The jet nozzles in presently employed apogee engines of satellites have different diameters. Jet nozzles with neck diameters of 16 mm to 22 mm are used. In the embodiment of a docking device, known from DE 10 2006 009 001, only jet nozzles of 16 to 19 mm can be engaged. It would be possible to widen the opening angle and thus the diameter of engagement of the lever spreaders. If, however, a smaller jet nozzle were engaged by a docking device of a large diameter of engagement of the lever spreaders, the force application point would be on the sides of the spreader levers. The resulting wedging action would exert extremely great forces on the lever spreaders, which would result in great damage to the lever spreaders so that the docking device as such would become useless. Accordingly, such a solution is inappropriate.

To meet the standards set by satellite operators, space shuttles would have to be launched that have respective differently configured docking devices for two satellites.

SUMMARY OF THE INVENTION

It is an object of the present invention to configure a docking device of a space shuttle such that the diameters of engagement of the lever spreaders may be adapted to the size of the neck of a respective jet nozzle of an apogee engine to be engaged.

According to the invention, this is achieved in a device for docking to satellites, provided on a space shuttle, with the features of claim 1. Advantageous embodiments are the subject matter of dependent claims.

In a preferred embodiment of the invention, a rotatable sleeve is provided below the lever spreader retaining part, which sleeve is concentric to the linkage, wherein a distal—relative to the space shuttle—annular portion of the sleeve is formed with engaging positions of different heights. The engaging positions are preferably designed with the same width, but with alternately different heights. From the proximal end portion—relative to the space shuttle—of the sleeve, two pins project that are guided by associated obliquely oriented slide faces in a housing secured against rotation, the pins being provided for setting the adjustment travel of the linkage.

In an advantageous development of the invention, the adjustment travel of the linkage with respect to the pins of the sleeve is set by tabs with inclined slide faces provided on a stationary sliding ring and oriented toward a stationary housing. Projections with inclined slide faces are provided in the housing, which are oriented corresponding to the inclined slide faces of the sliding ring.

Thus, according to the invention, the engaging positions of the lever spreaders can be changed using the rotatable sleeve, so that it is possible, by means of one and the same docking device, to set two different opening angles or diameters of engagement of the lever spreaders corresponding to the different sizes of the nozzle necks of apogee engines.

According to the invention, the sleeve is rotated stepwise not by an additional actuator, which requires additional space and consumes energy, but by converting a linear advance movement of the linkage into a rotary movement of the sleeve. According to the invention, when the sleeve is rotated stepwise, the two pins at the proximal end of the sleeve slide on specially inclined and stationary slide faces. The space required by the rotatable sleeve and the slide elements is limited. Moreover, no active control, no control electronics and no actuator are required.

BRIEF DESCRIPTION OF THE DRAWINGS

The following is an explanation of the invention with reference to the accompanying drawings. In the Figures.

DESCRIPTION OF PREFERRED EMBODIMENTS OF THE INVENTION

Figure 1A:
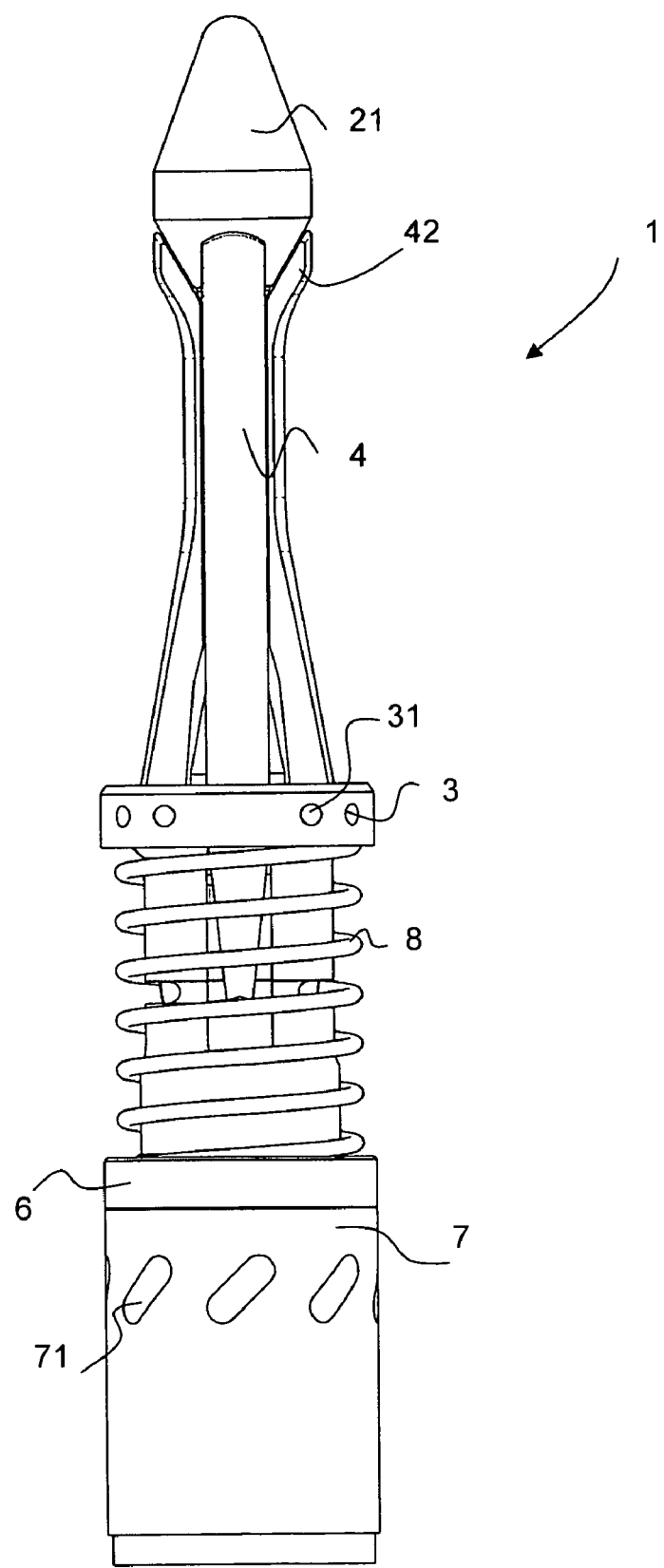
FIGS. 1a and 1b are a front view and a section through a docking device with lever spreaders abutting thereon.
Figure 1B:
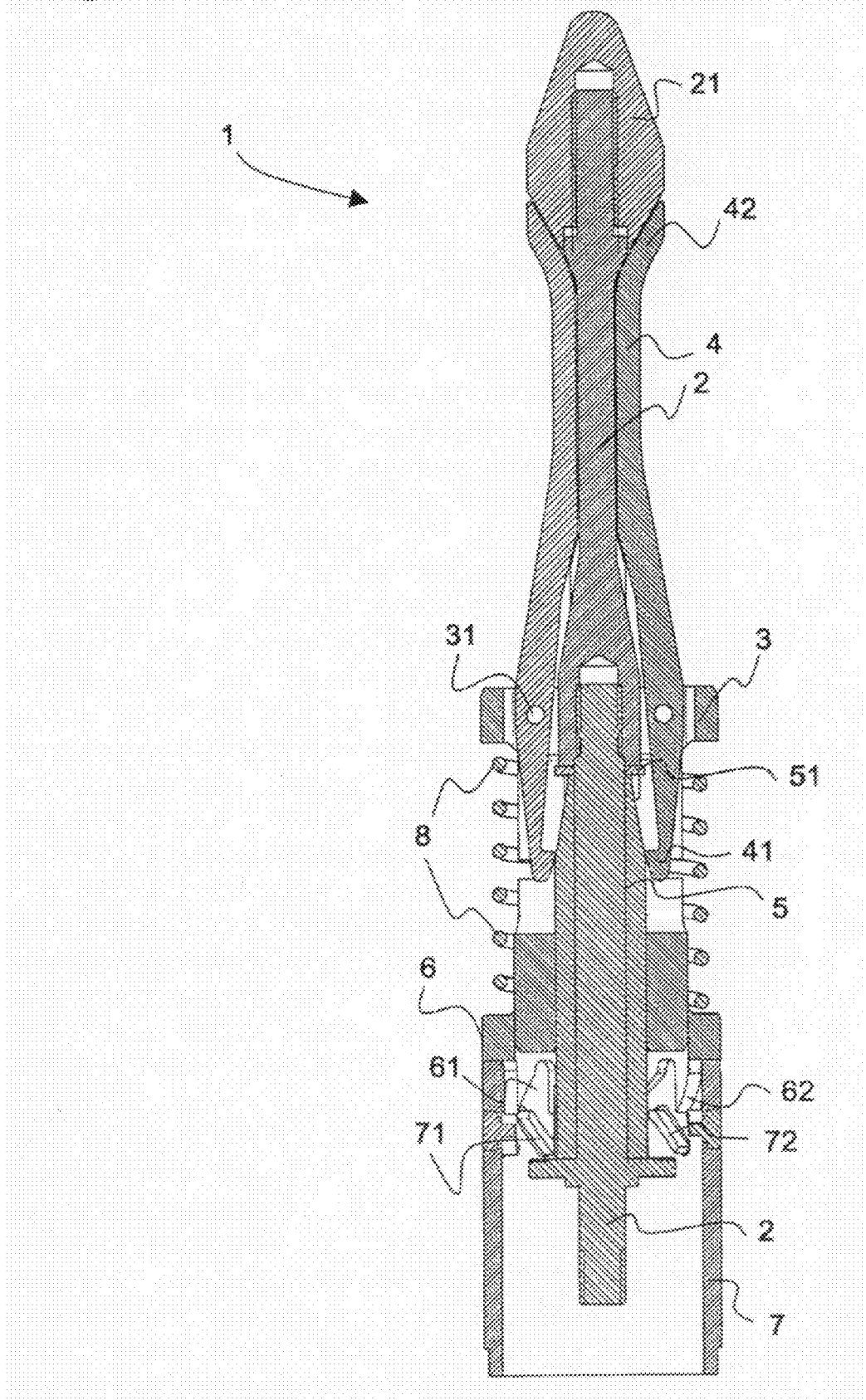

FIGS. 1a and 1b are schematic illustrations of essential parts of a docking device 1, namely an elongate linkage 2 with a cone 21 at its upper end and a retaining part 3 concentric to the linkage 2, below which a helical spring 8 is arranged and in which retaining pins 31 are inserted that serve as axes of rotation around which at least two, preferably four equidistantly distributed spreader levers 4 are pivotally supported.

At the lower ends of the lever spreaders 4, inward projections 41 are formed that project inward towards the linkage 2. At their outward directed ends 42, the outer surfaces of the lever spreaders 4 each have curvature adapted to the curvature of the nozzle neck of a satellite engine. The linkage 2 and the retaining part 3 are secured against rotation.

Below the retaining part 3, FIG. 1b shows a rotatable sleeve 5 arranged concentrically to the linkage 2; the sleeve 5 comprises an annular portion 51 at its upper end in FIG. 1b. At the lower end of the docking device in FIG. 1b, a stationary sliding ring 6 with downward projecting tabs 61, as well as a stationary housing 7 with inward directed projections 71 are illustrated, which are shown in more detail in FIGS. 2 to 4.

Figure 2:
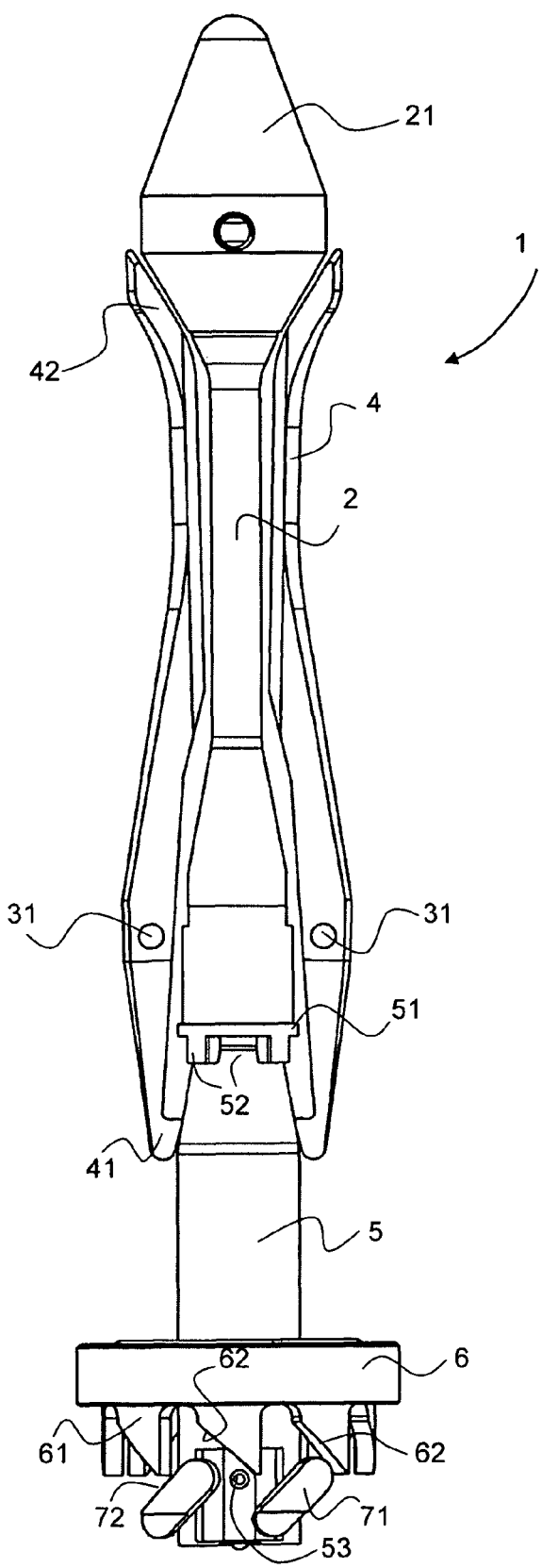
FIG. 2 is a schematic illustration of essential parts of the docking device.
Figure 3:
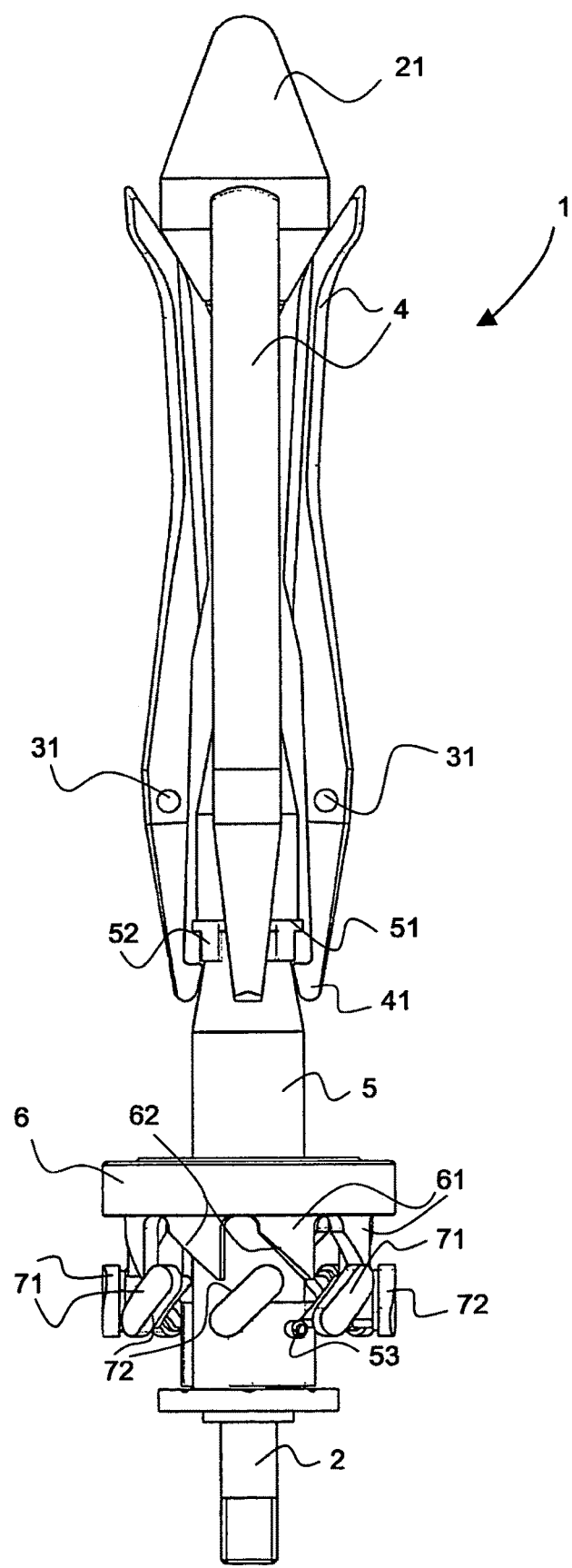
FIG. 3 is an enlarged illustration of the functional elements of the docking device.
Figure 4:
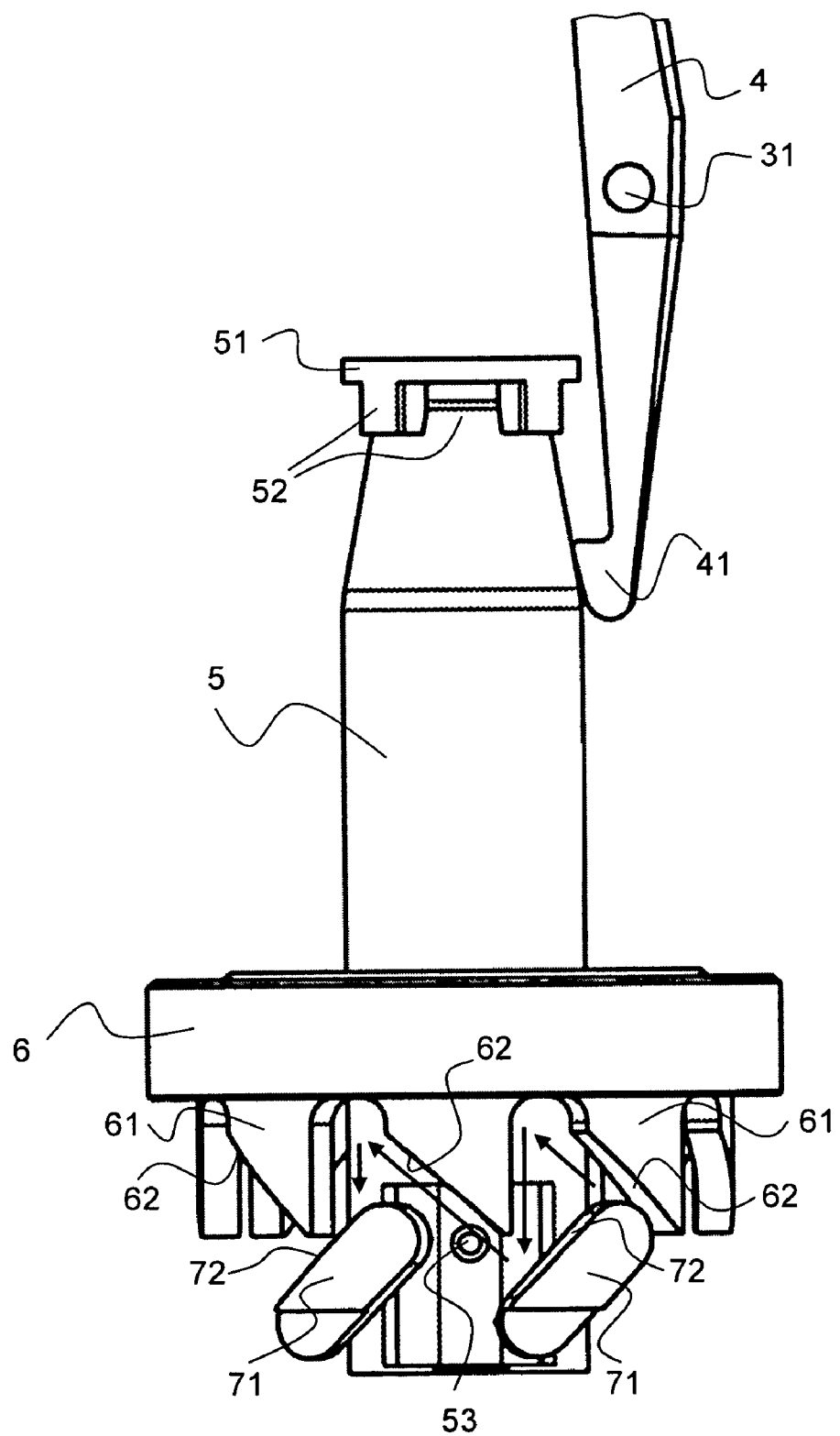
FIG. 4 is an illustration similar to FIG. 3, showing the functional elements of the docking device in detail.

FIG. 2 is a schematic illustration of a docking device 1 with lever spreaders 4 abutting thereon, which lever spreaders are supported for pivotal movement about the retaining pins 31 provided in the retaining part 3. The rotatable sleeve 5, concentric to the linkage 2, is provided below the retaining part 3 not illustrated in FIG. 2. In an annular portion 51 at the upper end of the rotatable sleeve 5 engaging positions 52 of equal width but different heights are formed. Since the docking device 1 illustrated in FIGS. 1 to 3 is provided with four lever spreaders 4, the annular portion 51 of the sleeve 5 is formed with alternately arranged four high and four low engaging positions 52. Pins 53 project from the lower end of the rotatable sleeve 5.

The stationary sliding ring 6 with the downward directed tabs 61 is illustrated as being concentric to the sleeve 5 and the linkage 2 not illustrated in the lower part of FIG. 2, the tabs having oblique slide faces 62. Of the projections 71 protruding into the housing 7, only two projections 71 with their slide faces 72 are shown in FIG. 2.

Hereinafter, the functioning of the docking device will be described. The docking device 1 with the lever spreaders 4 abutting thereon (FIGS. 1 and 2) is inserted, for example, into a non-illustrated jet nozzle of an apogee engine with a neck diameter of 16 to 19 mm. Different from FIG. 2, the linkage 2 in FIG. 3 is withdrawn so far towards a non-illustrated space shuttle that in FIG. 3 the inward projections 41 formed at the lower end of the lever spreaders 4 have engaged in the high engaging positions 52. When engaging, the lever spreaders 4 are spread so far by the cone 21 at the distal end of the linkage 2 that the predetermined defined opening angle is obtained between them.

Further retracting of the linkage 2, e.g. by means of a motor, will compress the compression spring 8 (FIG. 1). At the same time, the lever spreaders 4 caught in the high engaging positions 52 of the sleeve 5 are retracted so far that the ends 42 of the lever spreaders 4 positively abut on the inner wall of a non-illustrated nozzle neck.

If the space shuttle is to be uncoupled from the apogee engine, the linkage 2 is advanced towards the nozzle of the apogee engine until the lever spreader 4 abut on the linkage 2 in the manner illustrated in FIG. 2. When the linkage 2 is advanced, the pins 53 at the proximal end of the rotatable sleeve 5 slide along the slide faces 62 of the sliding ring tabs 61 or the slide faces 72 of the projections 71, as indicated by the arrows in the enlarged illustration in FIG. 4.

Since the retaining part 3 of the docking device 1 is provided with four pivotable lever spreaders 4, the annular portion 51 of the sleeve 5 is provided with a total of eight engaging positions 52, i.e. four high and four low engaging positions in alternating arrangement. Since the linkage 2 has been advanced so far towards the apogee engine that the lever spreaders 4 again abut on the linkage, the sleeve 5 has been rotated further, i.e. through 450, as described with reference to FIG. 4. (360°: 8 (engaging positions)=45°).

When the docking device 1 has been retracted from the jet nozzle of the apogee engine and is to be docked to another apogee engine thereafter, whose nozzle has a neck diameter of 18 to 22 mm, the docking device 1 may be inserted into this nozzle. When the linkage 2 is then retracted, the inward projections 41 of the lever spreaders 4 engage in the lower engaging positions 52, whereby a predetermined defined opening angle of 24 mm is obtained. By retracting the linkage 2 correspondingly, the ends 42 of the lever spreaders 4, spread in a defined manner, positively abut on the inner wall of the nozzle neck of this apogee engine.

If, however, a docking to nozzles is to be made twice in a row, where the lever spreaders have to be spread to the same diameter as in the previous docking operation, a "dummy operation" of the docking device has to be performed so that the sleeve 5 is rotated through 90° instead of 45°. However, since the sleeve 5 is always rotated in the same sense of rotation, this can be repeated any number of times. It should be observed, however, that the opening diameter that had been set is noted or memorized, since a possible damage to the docking device can only be prevented in this manner.

Although the invention has been described and illustrated with reference to specific embodiments thereof, it is not intended that the invention be limited to those illustrative embodiments. Those skilled in that art will recognize that variations and modifications can be made without departing from the true scope of the invention as defined by the claims that follow. It is therefore intended to include within the invention all such variations and modifications as fall within the scope of the appended claims and equivalents thereof.

LIST OF REFERENCE NUMERALS 1 docking device
2 linkage
21 cone at 2
3 retaining part
31 retaining pins
4 lever spreaders
41 noses inward projections at 4
42 ends of 4
5 rotatable sleeve
51 annular portion of 5
52 engaging positions in 51
53 pins
6 sliding ring
61 tabs at 6
62 slide faces on 61
7 housing
71 projections at 7
72 slide faces on 71
8 helical spring

What is claimed is:

1. A device provided on a space shuttle for docking to satellites, in particular communication or navigation satellites, which device comprises a linkage with a cone at its distal end—relative to the space shuttle—and a spreader mechanism, actuatable from the space shuttle, with spreader elements in the form of lever spreaders having their proximal ends—relative to the space shuttle—provided with inward projections protruding inward towards the linkage, wherein at least two lever spreaders of the device are pivotally arranged at a retaining part concentric to the linkage and the curvature at the distal end of each lever spreader is adapted to the curvature of the nozzle neck of the jet nozzle of a satellite engine, wherein
a rotatable sleeve is provided below the retaining part, which sleeve is concentric to the linkage, wherein a distal—relative to the space shuttle—annular portion of the sleeve is formed with respective alternating engaging positions of different heights, and wherein, from the proximal end portion—relative to the space shuttle—of the sleeve, two pins project that are guided by associated obliquely oriented slide faces in a stationary housing, the pins being provided for setting the adjustment travel of the linkage.

2. The device of claim 1, wherein the different engaging positions have equal widths but alternately different heights.

3. The device of claim 1, wherein, for the adjustment travel of the linkage by means of the pins of the sleeve, tabs directed towards the stationary housing are formed at a stationary sliding ring and projections with oblique slide faces are provided in the housing, said slide faces being directed corresponding to the oblique slide faces of the sliding ring.

4. The device of claim 1, wherein the lever spreader retaining part and the linkage are secured against rotation.

* * * * *